Effect of pretreatment time and temperature after 60% cold reduction on grain size and structure of steel D (0.84% Cu)

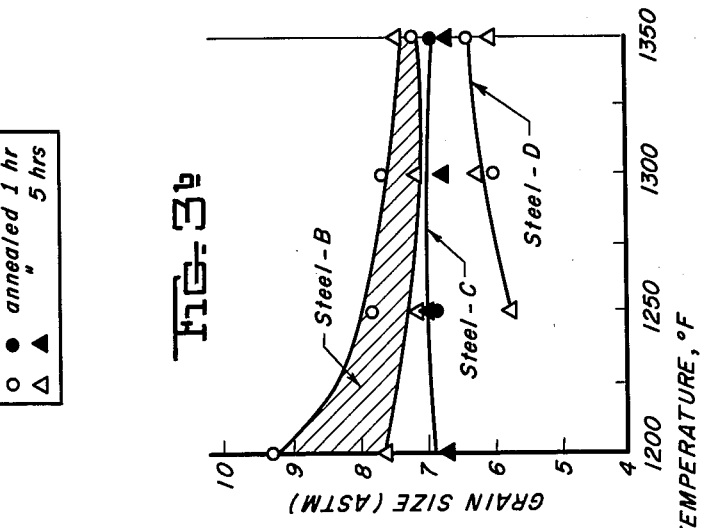
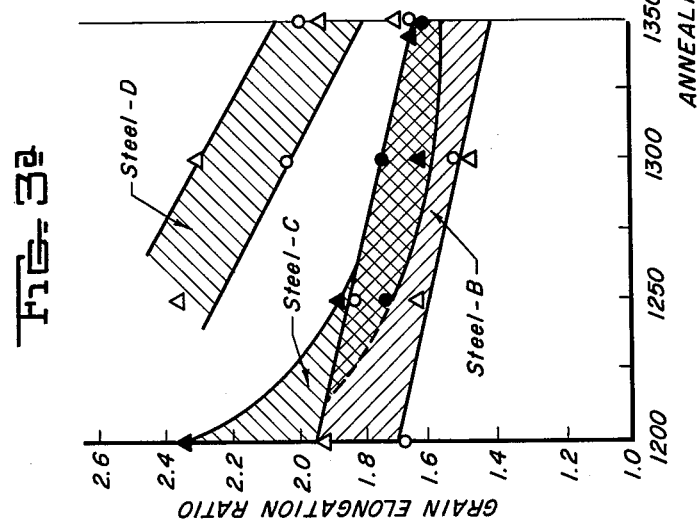
Effect of annealing temperature on grain elongation and grain size of steels B, C and D for 6-hour pretreatment at 950°F after 60% cold reduction

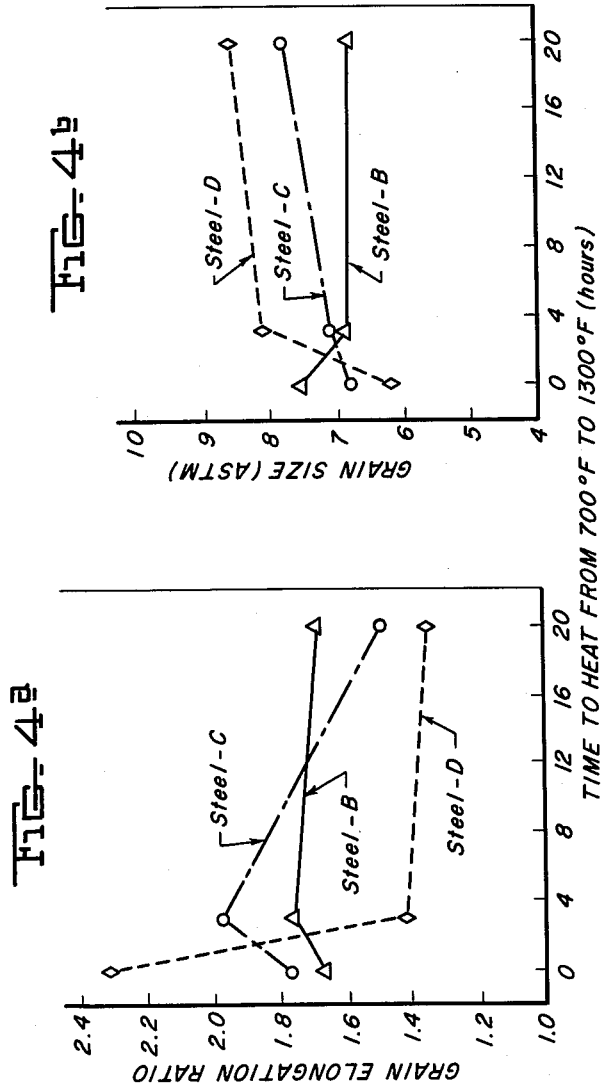

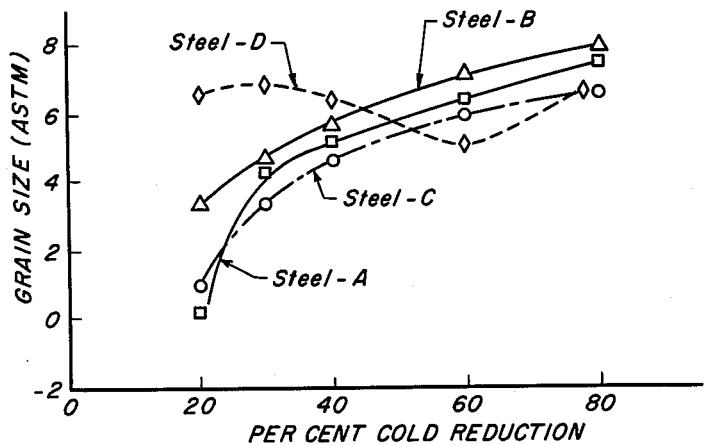
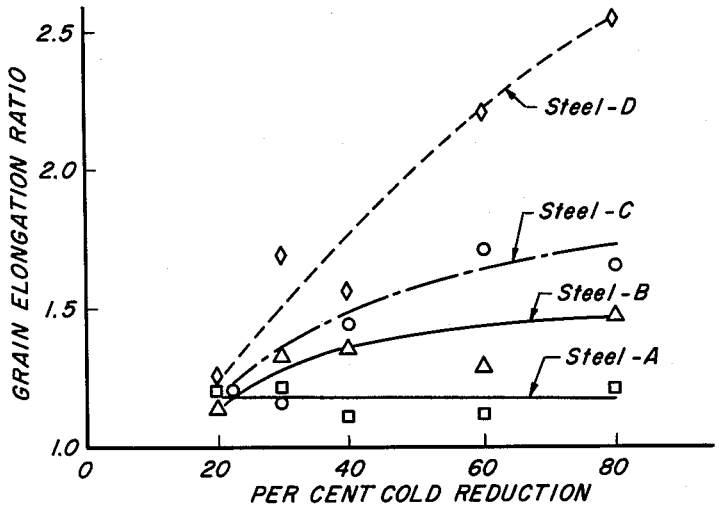
Effect of degree of cold reduction on grain elongation and grain size as pretreated 6 hours at 950°F after cold reduction and then heated rapidly to 1300°F and held for four hours.
INVENTORS
WILLIAM C. LESLIE and
REGINALD L. RICKETT
By Donald G. Dalton
Attorney

United States Patent Office 2,986,483
Patented May 30, 1961

2,986,483
METHOD OF MAKING SHEETS WITH ELONGATED GRAIN STRUCTURE FROM RIMMED STEEL

William C. Leslie and Reginald L. Rickett, Franklin Township, Westmoreland County, Pa., assignors to United States Steel Corporation, a corporation of New Jersey Filed June 20, 1958, Ser. No. 743,450

7 Claims. (Cl. 148—12)

This invention relates to a method of obtaining a coarse, elongated grain structure and good deep drawing characteristics in rimming type steel.

It has heretofore been recognized that deep drawing characteristics of steel are enhanced by development in the steel of a coarse, elongated grain structure. Such structure is generally considered to be a grain size number of less than 8 according to the standard ASTM determination combined with a ratio of the grain length in the rolling direction to that in the thickness direction of at least 1.5. Heretofore, it has only been possible to develop such structure in fully killed steels having a residual aluminum content resulting from "over-killing" of the steel. Despite the desirability of using rimming type steel to obtain the good surface and other desirable characteristics thereof for automobile fenders, decks and other articles subjected to deep drawing, such type of steel has not been suitable for many severe deep drawing operations.

It is accordingly an object of this invention to provide a coarse, elongated grain structure and attendant good deep drawing characteristics in steels substantially free from aluminum.

It is a further object of this invention to provide a coarse, elongated grain structure and attendant deep drawing characteristics in rimming type steel.

The foregoing and further objects will be apparent from the following specification when read in conjunction with the attached drawings, wherein:

Figure 3 is a graph showing effect of annealing temperature following 6-hour pretreatment at 950° F. and 60% cold reduction;

Figure 4 is a graph showing effect of heating rate for 6-hour pretreatment at 950° F. after 60% cold reduction, annealed 4 hours at 1300° F.; and Figure 5 is a graph showing effect of degree of cold reduction as pretreated 6 hours at 950° F. after cold reduction and heating rapidly to 1300° F. and holding at such temperature for 4 hours.

We have discovered that rimming type steels containing copper above about .40% will develop a coarse, elongated grain structure if subjected to suitable treatment. Because of excessive precipitation which markedly retards recrystallization, the copper content should preferably not exceed about 1.0%.

Rimming type steels as herein discussed are understood to have carbon less than about .35% since steels containing carbon up to about such amount can be induced to "rim" satisfactorily by use of suitable rimming agent additions to the mold during or immediately after teeming. Other elements may be present in amounts which do not adversely affect the rimming characteristics. Ordinarily, however, rimming steels are considered to be low carbon steels containing less than about .15% carbon, less than .60% manganese and silicon and having other elements present only in traces or residual amounts with the balance iron. Such steels are characterized by absence of aluminum beyond the minor amount required to control the rimming action as required with low carbon contents.

To illustrate the teachings of our invention, steels of the following composition were investigated:

| Steel | Composition, Percent | | | | | | | |
|---|---|---|---|---|---|---|---|---|
| | C | Mn | P | S | Si | Cu | Al | N |
| A | 0.06 | 0.57 | 0.007 | 0.013 | 0.004 | 0.01 | 0.004 | 0.007 |
| B | 0.06 | 0.63 | 0.007 | 0.013 | 0.004 | 0.43 | 0.004 | 0.005 |
| C | 0.06 | 0.53 | 0.005 | 0.013 | 0.005 | 0.61 | 0.006 | 0.005 |
| D | 0.05 | 0.48 | 0.007 | 0.012 | 0.004 | 0.84 | 0.006 | 0.006 |

These steels were made according to rimmed steel practice, using only enough aluminum to control the rimming action. The amount of aluminum present is too low to permit the formation of effective amounts of aluminum nitride at the recrystallizing temperatures used subsequently. The degree of grain elongation was determined by the method described in United States Patent No. 2,597,979 to Darmara.

The steel was first hot-rolled by conventional methods and cooled according to usual practice for hot-rolled strip or plate. In the work described, sections 0.15 inch or more thick of the steels listed in the table were heated to approximately 1650° F. and cooled in air to simulate the condition resulting from conventional hot-rolling practice. They were then cold rolled and annealed as hereinafter described.

Figure 1:
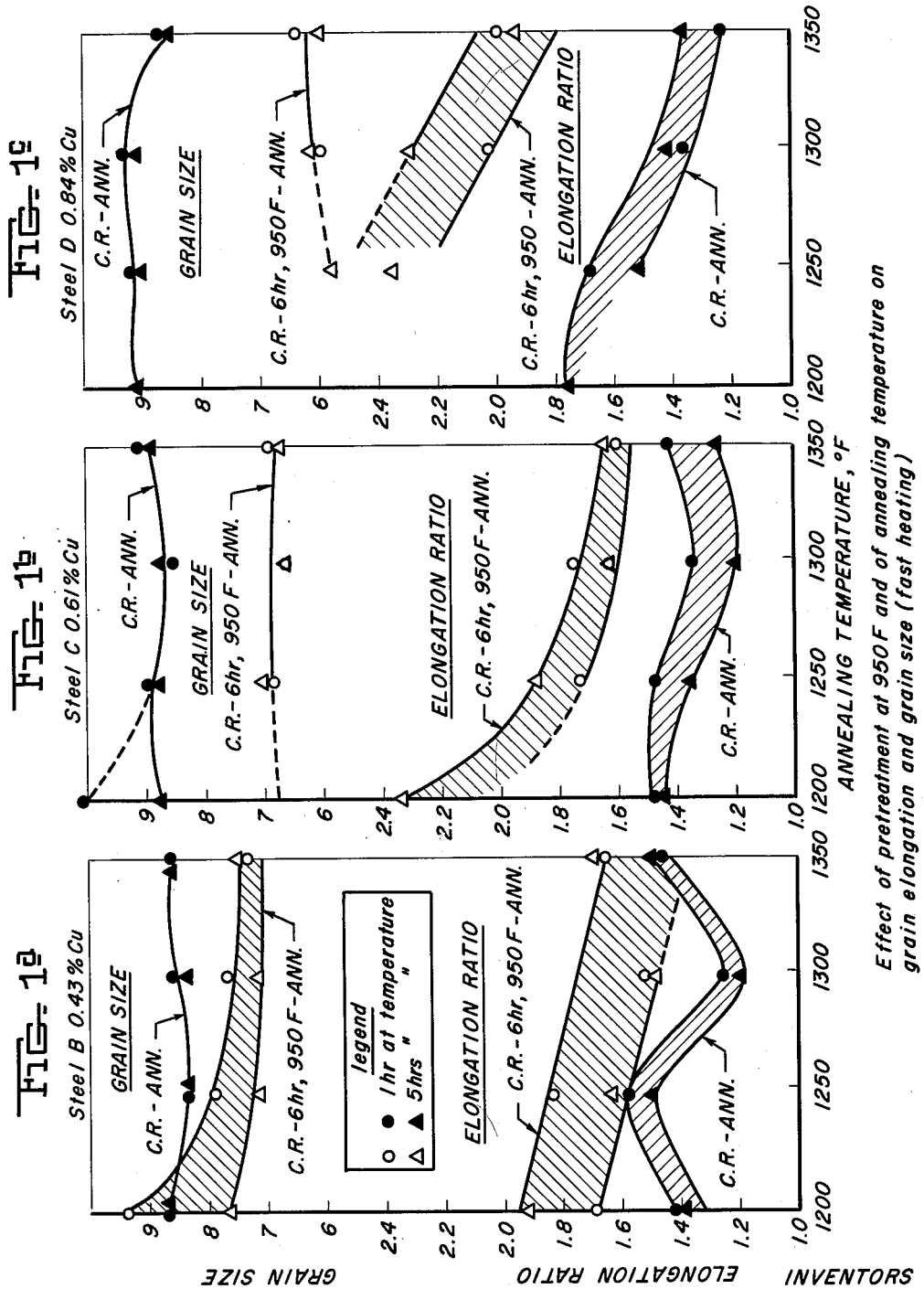
Figure 1 is a graph showing effect of pretreatment at 950° F. and of annealing temperature on grain elongation and grain size following 60% cold reduction.

To illustrate the teachings of our invention, the cold-reduced steel was pretreated by holding at a temperature below the recrystallizing temperature before the recrystallizing anneal. Figure 1 shows the effect of pretreatment time at 950° F following cold reduction and of annealing temperature on grain size and grain elongation in contrast to the effect of cold reducing and annealing without pretreatment. In these tests, the 0.43, 0.61 and 0.84% copper steels were annealed for 1- and 5-hour periods at 1200, 1250, 1300 and 1350° F. The steels were first cold reduced 60% and one set of specimens was then held 6 hours at 950° F. and a companion set was cold reduced only before annealing. The results indicate that under these conditions, the maximum degree of elongation is obtained by annealing at the lowest temperature at which the steel will completely recrystallize. Only a moderate degree of elongation was found in the 0.43% copper steel and increased with the higher copper contents.

Figure 2:
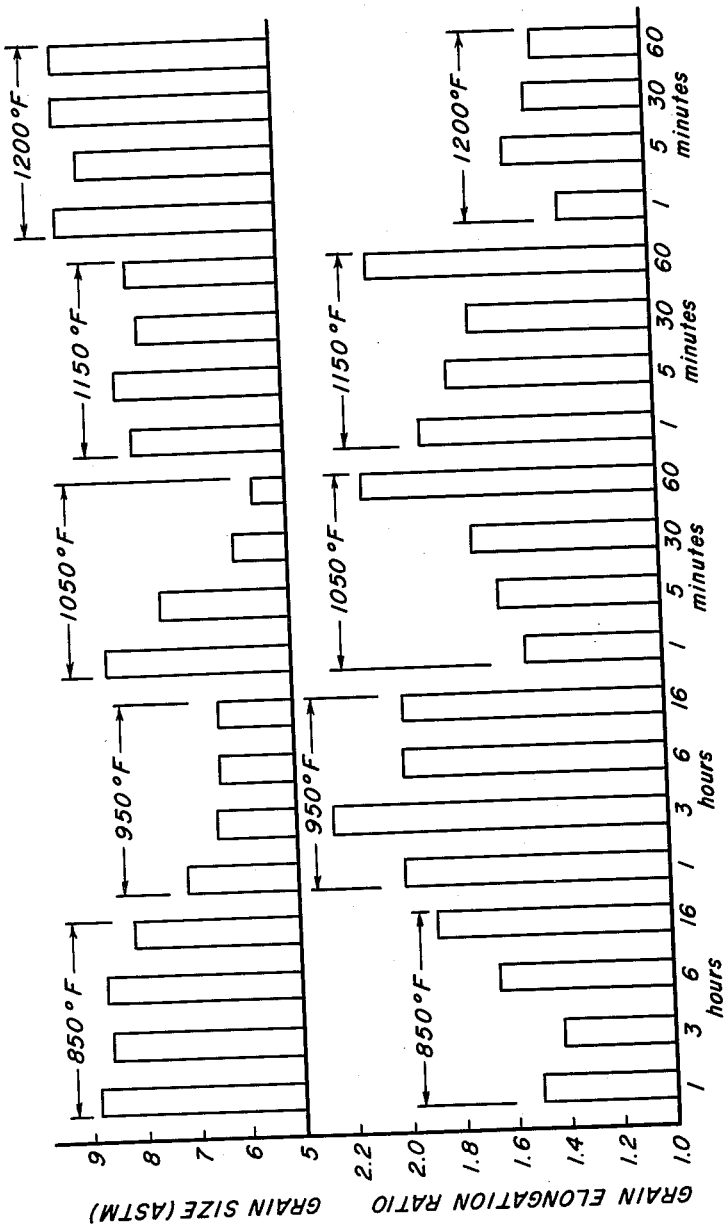
Figure 2 is a graph showing effect on elongation ratio and grain size of .8% copper steel of pretreatment time and temperature after 60% cold reduction.

Figure 2 shows the effect of variations in pretreatment, after cold reduction, on grain elongation and grain size of Steel D, cold reduced 60% in thickness and annealed for 5 hours at 1300° F. This shows that optimum temperature range for the pretreatment is 950 to 1150° F. At 850° F., a very long time is required and results in the grain size being too fine; pretreatment at 1200° F. was ineffective to produce an elongated grain and results in fine grain. For the optimum combination of elongated grain structure and large grain size, a minimum pretreatment time of 3 hours at 950° F. or about 1 hour at 1050° F. is required. Longer times may be used without substantially affecting the desired combination of grain size and elongation.

The optimum annealing temperature after a suitable pretreatment is the lowest temperature that will completely recrystallize the steel, as shown in Figure 3. The data therein represent the result of heating very rapidly to the annealing temperature. Rate of heating to the annealing temperature is also important, as shown in Figure 4. Grain structure of Steel B was elongated regardless of heating rate, Steel C was elongated if heated rapidly or at an intermediate rate, whereas Steel D was elongated only if heated rapidly.

The degree of grain elongation after annealing is increased by increasing the amount of cold reduction as shown in Figure 5. For the particular treatments used, Steel D did not recrystallize completely unless cold reduced at least 60%. Steels B and C required a minimum of 40% reduction to develop a detectable degree of elongation. Grain structure of Steel A was not elongated regardless of amount of reduction. The minimum amount of cold reduction required is, therefore, between 30 and 40% and the minimum copper content necessary is approximately 0.4%.

Similar effects can be obtained in low carbon steels containing copper by controlling the rate of heating to less than 200° F. per hour in the range of 750 to 1150° F. and thereafter rapidly heating to the annealing temperature.

While we have shown and described several embodiments of our invention, it will be understood that these embodiments are merely for the purpose of illustration and description and that various other forms may be devised within the scope of our invention, as defined in the appended claims.

We claim:

1. A method of producing an elongated grain structure in rimmed steel characterized by good deep drawing characteristics comprising producing rimming type steel containing copper in excess of .40%, cold reducing said steel at least 30%, heating said cold reduced steel within the range of 750 to 1150° F. for at least 1 hour and then annealing said steel at a temperature above its recrystallizing temperature.

2. A method of producing an elongated grain structure in rimmed steel characterized by good deep drawing characteristics comprising producing rimming type steel containing copper in excess of .40%, cold reducing said steel at least 30%, heating said cold reduced steel through the range of 750 to 1150° F. at a rate of less than 200° F. per hour and then annealing said steel at a temperature above 1250° F.

3. A method of producing an elongated grain structure in rimmed steel characterized by good deep drawing characteristics comprising producing rimming type steel containing copper in excess of .40%, cold reducing said steel at least 40%, holding said cold reduced steel within the range of 950 to 1150° F. for at least 30 minutes and then annealing said steel at a temperature above its recrystallizing temperature.

4. A method of producing an elongated grain structure in rimmed steel characterized by good deep drawing characteristics comprising producing rimming type steel containing copper in excess of .40%, cold reducing said steel at least 40%, holding said cold reduced steel at about 1050° F. for about 30 minutes and then annealing said steel for about 5 hours at 1300° F.

5. A method of producing an elongated grain structure in rimmed steel characterized by good deep drawing characteristics comprising producing rimming type steel containing between .40 and 1.0% copper, cold reducing said steel at least 40%, holding said steel within the range of 950 to 1150° F. for at least 30 minutes, quickly raising the temperature thereof to above its recrystallizing temperature and holding at such temperature for at least 5 hours.

6. A method of producing an elongated grain structure in rimmed steel characterized by good deep drawing characteristics comprising producing rimming type steel containing between .40 and 1.0% copper, cold reducing said steel at least 40%, holding said cold reduced steel at about 1050° F. for about 30 minutes, quickly raising the temperature thereof to about 1300° F. and holding at such temperature for about 5 hours.

7. A rimmed cold reduced steel sheet product having an ASTM grain size number less than 8 and elongated grains having an elongation ratio in excess of 1.5 characterized by good deep drawing characteristics, the steel of said product containing between 0.40 and 1.0% copper with the balance mainly carbon, manganese and iron in amounts typical of rimmed steel.

References Cited in the file of this patent

FOREIGN PATENTS

| 127,708 | Australia | May 6, 1948 |
| 465,804 | Canada | June 13, 1950 |

OTHER REFERENCES

Jevons Metallurgy of Deep Drawing and Pressing, pp. 64–67, John Wiley & Sons, 1942.

The Alloys of Iron and Copper, McGraw-Hill Book Co., pp. 60–64, 1934.

Cold Rolling and Annealing Blast Furnace and Steel Plant for July 1936, pp. 613 and 617.